United States Patent Office

2,854,736
Patented Oct. 7, 1958

2,854,736

BORON NITRIDE-METAL SILICIDE BODIES AND THE MANUFACTURE THEREOF

Kenneth M. Taylor, Lewiston, N. Y., assignor to The Carborundum Company, Niagara Falls, N. Y., a corporation of Delaware No Drawing. Application January 20, 1955
Serial No. 483,160

11 Claims. (Cl. 29—182.5)

This invention relates to shaped bodies or articles of manufacture comprising boron nitride and refractory transition metal silicide, and to methods for making the same.

There is a constant search for new compositions or bodies that possess unexpected combinations of properties essential to or desirable in specific fields of use. The bodies of the present invention possess certain combinations of properties and characteristics that render them of considerable value, and they offer outstanding possibilities in a number of fields of use. It is, therefore, to be understood that the refractory transition metal silicide-boron nitride bodies hereinafter more fully described are not to be considered as restricted to any particular field of use. However, their outstanding characteristics as refractory materials are particularly worthy of note and make them especially suitable for many refractory purposes. The present invention therefore will be described primarily in respect to using the herein described products for refractory purposes, although not intended to be limited thereto.

Above all a refractory body must possess refractoriness, that is, ability to stand up under exposure to high temperatures without undue chemical or physical change. Other desirable characteristics sought in a refractory body or shape include an ability to resist sudden changes in temperature without cracking or otherwise breaking down, a satisfactorily high mechanical strength at elevated temperatures as well as at room temperature, chemical inertness and resistance to various corrosive and erosive substances and conditions, resistance to oxidation, and an appropriate density and hardness dependent upon the use to which the refractory body or shape is to be put.

In order to obtain a high degree of perfection in one or more of the above properties, it usually has been necessary to forego the benefit of maximum performance in respect to certain other desirable properties. Consequently, refractory compositions exceptionally suited for one use frequently are entirely unsatisfactory for other purposes. There is, therefore, a continual need for refractory bodies of new compositions that will meet those demands of a special nature that require novel combinations of properties not to be found in compositions already available.

It is an object of the present invention to provide bonded bodies or shaped articles of manufacture of unusual and distinctive compositions and properties.

It is another object to provide refractory bodies or shapes having particular combinations of properties heretofore unavailable in refractory compositions.

It is another object to provide novel compositions of matter comprising refractory transition metal silicide and boron nitride.

It is a further object to provide practical methods and compositions for making such articles.

The shapes or bodies of the present invention comprise boron nitride and refractory transition metal silicide. They also contain the solid reaction products of boron nitride and refractory transition metal silicide, including refractory transition metal boride. If desired, the bodies of the present invention may also contain auxiliary metal and/or the reaction product of this metal with the other ingredients of the body.

The term "refractory transition metal" as used in the specification and claims of this application means the transition metals of the 4th, 5th, and 6th group of Mendelyeev's periodic table, namely, titanium, zirconium, hafnium, vanadium, columbium, tantalum, chromium, molybdenum and tungsten.

The term "auxiliary metal" as used herein means a metal selected from the group consisting of cobalt, nickel and mixture thereof.

The refractory transition metals differ from the auxiliary metals in at least one important aspect insofar as the present invention is concerned. Whereas the auxiliary metals neither react with nor decompose boron nitride at the elevated temperatures encountered in the manufacture of the bodies of the present invention, the refractory transition metals do react with or decompose boron nitride at these temperatures. Therefore, insofar as boron nitride is concerned it may be stated that these auxiliary metals are "not-reactive" metals, whereas the refractory transition metals are "reactive" metals. However, it is to be pointed out that the fact that the auxiliary metals are non-reactive towards boron nitride does not mean that the auxiliary metal will exist as such in those bodies made from raw mixes containing an auxiliary metal. In many cases part or all of the auxiliary metal reacts with either the refractory transition metal silicide or the products of the reaction between the refractory transition metal silicide and boron nitride, giving a body containing auxiliary metal present in elemental form and/or in compound form.

The bodies of the present invention are produced by first preparing or selecting an intimately commingled finely divided raw mix comprising refractory transition metal silicide and boron nitride with or without auxiliary metal. This raw mix is then placed in a closed mold with a movable plunger and preferably hot pressed by simultaneously subjecting the mold and contents to heat and pressure, the heat and pressure being maintained until the downward movement of the plunger ceases, indicating that maximum density has been obtained. If desired, these bodies can also be made by cold forming to the desired shape followed by sintering in an inert atmosphere.

Boron nitride may be present in the raw mixes of the present invention from almost zero percent, such as 1% or 2%, to almost 100% by weight of the raw batch. Likewise, transition metal silicide may be present in the raw mixes from almost zero percent, such as 1% or 2%, to almost 100% by weight of the raw batches. Auxiliary metal may be present in the raw batches of the present invention up to about 30% by weight. The combined amounts of boron nitride and refractory transition metal silicide should therefore be at least 70% by weight of the raw batches. The preferred raw mixes of the present invention contain at least 50% by weight of transition metal silicide with the remainder consisting essentially of boron nitride with or without auxiliary metal.

During hot pressing of the bodies of the present invention pressures of at least about 250# per square inch are employed, and usually 400# per square inch or more. While the exact pressure used is not highly critical, it has been found that somewhat stronger and denser bodies are produced when higher pressures are used.

The temperature employed during hot pressing of the bodies of the present invention is somewhat lower than the temperature at which the particular raw mix becomes so plastic as to be extruded from the mold around the plunger, usually being within the range of 1100° C. to 1800° C. With compositions high in refractory transition metal silicide, the maximum hot pressing temperature is usually slightly below the melting temperature of the silicide.

The boron nitride used in carrying out the present invention may be either a high or low purity boron nitride material available on the market. For example, it may be an impure boron nitride made in accordance with the process described in my copending United States patent application Serial No. 288,553, now Patent No. 2,808,314. Preferably however a high purity boron nitride material is employed, such as the material made in accordance with the process described in my United States patent application Serial No. 413,968, now abandoned. Boron nitride material is made in accordance with this patent application by first preparing a low purity boron nitride material, such as the boron nitride material prepared in accordance with the process of my above-mentioned patent application Serial No. 288,553, and then heating the low purity boron nitride material in an atmosphere of ammonia at a temperature ranging from about 1100 to 1500° C. A typical analysis of the resulting high-purity boron nitride material is as follows:

| | Percent |
|---|---|
| Boron | 43.3 |
| Nitrogen | 53.3 |
| Oxygen | 2.23 |
| Silica | 0.25 |
| Calcium | nil |
| Iron and aluminum oxides | 0.16 |

I have further found that if boron nitride prepared in accordance with my patent application Serial No. 288,553, is subsequently, before use, subjected to a heating pretreatment in which the material is heated in an inert atmosphere at a temperature in the neighborhood of 1900 to 2200° C., molded shapes containing the thusly treated material are superior for certain uses.

The refractory transition metal silicide employed in the process of the present invention may be any of the well-known refractory transition metal silicides, preferably being selected from the group consisting of molybdenum silicide, zirconium silicide, titanium silicide, chromium silicide, tungsten silicide, tantalum silicide, and mixtures thereof. The preparation of the refractory transition metal silicides used in carrying out the invention has been described in the literature and methods for their preparation need not be described for purposes of understanding or performing the practices of the present invention.

As pointed out above the refractory transition metal silicides react with and/or decompose the boron nitride at the temperatures encountered in the practice of the present invention. However, this reaction apparently does not proceed to completion in that refractory transition metal silicide and boron nitride are invariably present in the final product along with the one or more solid compounds resulting from the reaction of the silicide with boron nitride.

X-ray diffraction analyses of various bodies of the present invention show them to contain in every case refractory transition metal boride as well as boron nitride and refractory transition metal silicide. The products of the present invention can therefore be described as comprising, or consisting predominantly of, refractory metal silicides, boron nitride, and refractory metal boride. Alternatively they can be described as comprising refractory transition metal silicide, boron nitride and the solid reaction product thereof.

In order that the invention may be more clearly understood, the following examples are submitted as illustrative of compositions for and the manner of carrying out the present invention.

EXAMPLE I

A raw mix, consisting essentially of 50% by weight of finely divided boron nitride (made as per patent application Serial No. 413,968) and 50% by weight of finely divided molybdenum disilicide, was prepared by grinding the ingredients together for 24 hours in alcohol in a ball mill lined with sintered tungsten carbide. The resulting raw mix was placed in a cylindrical graphite mold having two movable graphite plungers. The assembled mold was placed in a graphite chamber of a high-frequency furnace and heated to a maximum temperature of 1700° C. The maximum temperature was maintained for a few minutes until no further motion of the graphite plungers was noticeable. During the heating of the mold and contents, a minimum pressure of 2000# per square inch was maintained on the mold plunger. The furnace was then allowed to cool to room temperature. The furnace chamber was cylindrical, 12" long and 4" inside diameter and was closed during the heating and cooling period except for an opening in the top about ½" in diameter through which temperature observations were made.

The resultant body was grey and metallic in appearance, had an apparent density of 2.04 grams per cubic centimeter, and when subjected to a sandblast penetration test showed a sandblast penetration hardness of .046" as compared to a sandblast penetration hardness of plate glass when subjected to the same test of .010". X-ray diffraction analysis showed the body to contain molybdenum disilicide, boron nitride, and molybdenum boride. The X-ray pattern also showed indications of free silicon in the body. This body then consisted essentially of molybdenum disilicide, boron nitride and the reaction product thereof. It could also be described as comprising molybdenum silicide, boron nitride and molybdenum boride.

EXAMPLE II

Boron nitride-refractory transition metal silicide bodies were made in accordance with the procedures set forth in Example I, except that the proportion of ingredients in the raw mixes, the hot pressing temperatures, and in some instances the particular silicide used were different. Table I below presents fabricating data, physical properties and X-ray diffraction analyses of the various bodies consisting essentially of boron nitride, refractory transition metal silicide, and the reaction products thereof.

Table I
BODIES COMPRISING BORON NITRIDE AND REFRACTORY TRANSITION METAL SILICIDE

| Bar No. | Raw Mix Composition, Percentage by Weight | Molding Temperature, °C. | Sandblast[1] Penetration, inches | Apparent Density, g./cc. | X-Ray Analysis |
|---|---|---|---|---|---|
| 1[2] | 50% BN / 50% MoSi$_2$ | 1,700 | .046 | 2.04 | MoSi$_2$, BN, Mo$_x$B$_y$,[3] Indication of Si. |
| 2 | 10% BN / 90% MoSi$_2$ | 1,550 | .003 | 4.54 | MoSi$_2$, BN, Mo$_x$B$_y$, Indication of Mo$_2$N and Si. |
| 3 | 75% BN / 25% MoSi$_2$ | 1,800 | .028 | 1.56 | MoSi$_2$, BN, M$_x$B$_y$, Mo$_2$N. |
| 4 | 75% BN / 25% MoSi$_2$ | 1,600 | .075 | 1.46 | MoSi$_2$, BN, M$_x$B$_y$, Indication of Si. |
| 5 | 75% BN / 25% ZrSi$_2$ | 1,800 | .031 | 2.70 | ZrSi$_2$, BN, ZrB$_2$, Indication of Zr. |

[1] Standard penetration on plate glass when subjected to the same penetration test is .010″.
[2] Example 1 data.
[3] The subscripts "x" and "y" designate various subscript numbers, the precise numbers not being readily ascertained by X-ray diffraction analysis.

As can be seen from the above table, bodies made from raw mixes containing a wide range of boron nitride and refractory transition metal silicide can be produced in accordance with the method of the present invention. In each case, X-ray diffraction analysis showed the final product to contain refractory transition metal silicide, boron nitride and refractory transition metal boride along with minor amounts of various other reaction products of the decomposition of boron nitride by the refractory transition metal silicide.

EXAMPLE III

Boron nitride-refractory transition metal silicide bodies were made in accordance with the procedures set forth in Example I, except that in addition to boron nitride and refractory transition metal silicide the raw mixes contained an auxiliary metal in finely divided form. Also various hot pressing temperatures were employed. Table II below presents fabricating data, physical properties and X-ray diffraction analyses of these bodies.

Table II
BODIES COMPRISING BORON NITRIDE, REFRACTORY TRANSITION SILICIDE AND AUXILIARY METAL

| Bar No. | Raw Mix Composition, Percentage by Weight | Molding Temperature, °C. | Sandblast[1] Penetration, inches | Apparent Density, g./cc. | X-Ray Analysis |
|---|---|---|---|---|---|
| 7 | 80% MoSi$_2$ / 10% BN / 10% Ni | 1,600 | .016 | 4.25 | MoSi$_2$, BN, Mo$_x$B$_y$, Ni. |
| 8 | 80% MoSi$_2$ / 10% BN / 10% Ni | 1,450 | .026 | 4.36 | MoSi$_2$, BN, Mo$_x$B$_y$, Ni$_2$Si. |

[1] Standard penetration on plate glass when subjected to the same penetration test is .047″.

Oxidation resistance tests over a wide range of temperatures on the bodies made in accordance with Example III have shown these bodies to have vastly improved oxidation resistance, as compared to boron nitride-refractory transition metal silicide bodies made from raw mixes containing no auxiliary metal. Consequently it is believed that such bodies, and particularly those bodies made from raw mixes high in refractory transition metal silicide, are ideally suited for use in electrical resistance heating elements and the like.

While the above examples describe the practice of the present invention as it pertains to the manufacture of bodies comprising molybdenum and zirconium silicides, substantially the same procedure can be used for the manufacture of bodies comprising one or more other refractory transition metal silicides.

It is to be understood that the products of the present invention in its various modifications are not to be limited to any specific field or fields of use. The products can be made in any desired shape as well as provided in granular or aggregate form. They are, therefore, not only suited for many of the uses for which industrial refractories are required, including bricks, blocks, setter tiles, muffles, kiln furniture, and special shapes for applications in and around furnaces and other high temperature equipment, but they are also well suited for many specialty high temperature applications, such as jet engine combustion chambers, linings for exhaust nozzles, rocket combustion chambers and exhaust nozzles, turbine blades, stator blades, lens fusion blocks, and the like. They are also suitable for the fabrication of laboratory ware, including combustion boats, crucibles, burner holders, and other shapes. The bodies of the present invention are also highly useful as catalysts or catalyst carriers and supports. Materials and articles of the present invention can also be used for making abrasive articles such as grinding wheels, sharpening stones, razor hones, and other grinding and polishing shapes and materials. The present bodies offer possible applications in the electrical and radio industry including supports in electric light bulbs, radio tubes, X-ray tubes, and radar equipment, resistors, grid leak resistors, and electric resistance heating elements. Certain of the bodies of the present invention, particularly those containing large amounts of BN, are suitable because of the low coefficient of friction of BN for various bearing uses such as sealing rings, glandular rings and the like.

Having described the invention it is desired to claim:

1. A sintered, shaped body consisting essentially of boron nitride, refractory transition metal silicide and refractory transition metal boride, said body containing a minimum of about 1% each of boron nitride and refractory transition metal silicide.

2. A sintered, shaped body consisting essentially of boron nitride, refractory transition metal silicide and up to 30% by weight of an auxiliary metal selected from the group consisting of cobalt, nickel and mixtures thereof, said body containing a minimum of about 1% each of boron nitride and refractory transition metal silicide.

3. A sintered, shaped body consisting essentially of boron nitride and molybdenum silicide, said body containing a minimum of about 1% each of boron nitride and molybdenum silicide.

4. A sintered, shaped body consisting essentially of boron nitride, molybdenum silicide and up to 30% by weight of an auxiliary metal selected from the group consisting of cobalt, nickel and mixtures thereof, said body containing a minimum of about 1% each of boron nitride and refractory transition metal silicide.

5. A raw mix for the manufacture of shaped bodies, said raw mix consisting of an intimately commingled mixture of finely divided material consisting essentially of boron nitride and refractory transition metal silicide, said raw mix containing a minimum of about 1% each of boron nitride and a refractory transition metal silicide.

6. A raw mix for the manufacture of shaped bodies, said raw mix consisting of an intimately commingled mixture of finely divided material consisting essentially of boron nitride, refractory transition metal silicide and up to 30% by weight of auxiliary metal selected from the group consisting of cobalt, nickel and mixtures thereof, said raw mix containing a minimum of about 1% each of boron nitride and a refractory transition metal silicide.

7. A raw mix for the manufacture of shaped bodies, said raw mix consisting of an intimately commingled mixture of finely divided material consisting essentially of at least 70% by combined weight of boron nitride plus refractory transition metal silicide, said raw mix containing a minimum of about 1% each of boron nitride and a refractory transition metal silicide.

8. A raw mix for the manufacture of shaped bodies, said raw mix consisting of an intimately commingled mixture of finely divided material consisting essentially of boron nitride and molybdenum silicide, said raw mix containing a minimum of about 1% each of boron nitride and molybdenum silicide.

9. A raw mix for the manufacture of shaped bodies, said raw mix consisting of an intimately commingled mixture of finely divided material consisting essentially of boron nitride, molybdenum silicide and up to 30% by weight of an auxiliary metal selected from the group consisting of cobalt, nickel and mixtures thereof, said raw mix containing a minimum of about 1% each of boron nitride and a refractory transition metal silicide.

10. A sintered, shaped body consisting essentially of 10% to 75% by weight boron nitride and 90% to 25% by weight of a refractory transition metal silicide, including the boride reaction products thereof.

11. A sintered, shaped body consisting essentially of 10% to 75% by weight boron nitride and 90% to 25% by weight of molybdenum silicide, including the boride reaction products thereof.

References Cited in the file of this patent

UNITED STATES PATENTS

| | | |
|---|---|---|
| 2,116,399 | Marth | May 3, 1938 |
| 2,116,400 | Marth | May 3, 1938 |